US012591221B2

(12) United States Patent
Huang et al.

(10) Patent No.: US 12,591,221 B2
(45) Date of Patent: Mar. 31, 2026

(54) SYSTEMS AND METHODS FOR IMPROVED THROUGHPUT FOR INDEPENDENT CARTS BASED ON TRANSIT TREND TIMES

(71) Applicant: Rockwell Automation Technologies, Inc.

(72) Inventors: Yuhong Huang, Acton, MA (US); Robert H. Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 670 days.

(21) Appl. No.: 18/079,254

(22) Filed: Dec. 12, 2022

(65) Prior Publication Data

US 2024/0192669 A1     Jun. 13, 2024

(51) Int. Cl.
| | |
|---|---|
| *G05B 19/418* | (2006.01) |
| *B65G 43/08* | (2006.01) |
| *B65G 54/02* | (2006.01) |
| *H02P 25/06* | (2016.01) |

(52) U.S. Cl.
CPC ......... *G05B 19/4183* (2013.01); *B65G 43/08* (2013.01); *B65G 54/02* (2013.01); *G05B 19/4185* (2013.01); *G05B 19/4189* (2013.01); *H02P 25/06* (2013.01)

(58) Field of Classification Search
CPC ............ G05B 19/4183; G05B 19/4189; G05B 19/4185; B65G 54/02; B65G 43/08; H02P 25/06
See application file for complete search history.

(56) References Cited

U.S. PATENT DOCUMENTS

| | | | | |
|---|---|---|---|---|
| 5,492,066 A | * | 2/1996 | Nozaki | ................. B65G 54/02 |
| | | | | 104/119 |
| 10,715,388 B2 | | 7/2020 | Fildebrandt et al. | |
| 11,182,206 B2 | | 11/2021 | Jung et al. | |
| 11,474,873 B2 | | 10/2022 | Biernat et al. | |

(Continued)

FOREIGN PATENT DOCUMENTS

| | | |
|---|---|---|
| KR | 20200027783 A | 3/2020 |
| WO | 2020184362 A1 | 9/2020 |

OTHER PUBLICATIONS

Extended European Search Report for European Patent Application No. 21179775.8, dated Nov. 25, 2021, 9 pages.

(Continued)

*Primary Examiner* — Thomas Randazzo
(74) *Attorney, Agent, or Firm* — Fletcher Yoder, P.C.

(57) ABSTRACT

A system includes one or more movers configured to move along a track of an industrial automation system and a computing device. The computing device receives data associated with the movers as the movers move around the track. The data includes a first amount of time for at least one of the movers to move between two stations disposed along the track, a second amount of time for the at least one mover to settle at a station, a third amount of time for a respective robot at the station to prepare to perform a process, and a fourth amount of time for the respective robot to perform the process. The computing device identifies throughput degradation based on the first amount of time, the second amount of time, the third amount of time, or the fourth amount of time, or any combination thereof.

20 Claims, 9 Drawing Sheets

(56) References Cited

U.S. PATENT DOCUMENTS

| | | | |
|---|---|---|---|
| 11,513,877 | B2 | 11/2022 | Biernat et al. |
| 2017/0081052 | A1* | 3/2017 | Aichinger ............... B65G 43/08 |
| 2018/0024537 | A1 | 1/2018 | Chauvet et al. |
| 2018/0054469 | A1 | 2/2018 | Simoncelli |
| 2019/0084781 | A1* | 3/2019 | Huang ..................... B60L 13/03 |
| 2019/0377604 | A1 | 12/2019 | Cybulski |
| 2020/0006100 | A1* | 1/2020 | Clark ................ H01L 21/68707 |
| 2020/0031594 | A1* | 1/2020 | Ragan ..................... B65G 54/02 |
| 2020/0136906 | A1 | 4/2020 | Bernat et al. |
| 2020/0249928 | A1 | 8/2020 | Zeng et al. |
| 2020/0278892 | A1 | 9/2020 | Nainar et al. |
| 2020/0311617 | A1 | 10/2020 | Swan et al. |
| 2021/0089354 | A1 | 3/2021 | Nixon et al. |
| 2021/0200814 | A1 | 7/2021 | Tal et al. |
| 2021/0218617 | A1 | 7/2021 | Palavalli et al. |
| 2021/0382727 | A1 | 12/2021 | Vigil et al. |
| 2022/0027217 | A1 | 1/2022 | Thoemmes et al. |
| 2022/0091572 | A1 | 3/2022 | Biernat et al. |

OTHER PUBLICATIONS

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-plcfrom-controller-to-cloud-interface , retrieved on Nov. 29, 2021, pp. 1-6.

European Search Report for European Patent Application No. 21180068.5, dated Mar. 28, 2022,19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022,12 Pages.

D. Elliott, C. Otero, M. Ridley and X. Merino, "A Cloud-Agnostic Container Orchestrator for Improving Interoperability," 2018 IEEE 11th International Conference on Cloud Computing (Cloud), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

"A Data-Centric Internet of Things Framework Based on Azure Cloud," IEEE Access, vol. 7, March pages.

* cited by examiner

SYSTEMS AND METHODS FOR IMPROVED THROUGHPUT FOR INDEPENDENT CARTS BASED ON TRANSIT TREND TIMES

BACKGROUND

The present disclosure generally relates to autonomous movers in industrial automation systems. More particularly, embodiments of the present disclosure are related to systems and methods for identifying throughput degradation in industrial automation systems based on data collected from autonomous movers in the industrial automation system, and identifying conditions contributing to the throughput degradation.

Various industries, such as manufacturing, filling, food, beverage, packaging, and material handling applications, may utilize mover systems. The mover system may include a track and multiple mover assemblies that may move along the track to transport various objects or products around the track. The mover system may include a control system, which may control the mover assemblies to facilitate performance of an industrial automation process via the mover system. For example, the control system may determine a control action and instruct the mover assemblies to perform the control action, such as by independently controlling movement of each mover assembly. Unfortunately, in some circumstances, conditions may develop or occur that lead to decreases in throughput. Accordingly, improved techniques for identifying conditions contributing to throughput degradation are needed.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes one or more movers configured to move along a track of an industrial automation system and a computing device. The computing device receives data associated with the one or more movers as the one or more movers move around the track. The data includes a first amount of time for at least one of the one or more movers to move between two stations of a plurality of stations disposed along the track, a second amount of time for the at least one mover to settle at a station of the plurality of stations, a third amount of time for a respective robot at the station to prepare to perform a process, and a fourth amount of time for the respective robot to perform the process. The computing device includes one or more hardware processors and identifies throughput degradation based on the first amount of time, the second amount of time, the third amount of time, or the fourth amount of time, or any combination thereof.

In another embodiment, an independent cart control system is configured to receive data associated with one or more independent carts of an industrial automation system as the one or more independent carts move around a track. The data includes a first amount of time for at least one of the one or more independent carts to move between two stations of a plurality of stations disposed along the track, a second amount of time for the at least one independent cart to settle at a station of the plurality of stations, a third amount of time for a respective robot at the station to prepare to perform a process, and a fourth amount of time for the respective robot to perform the process. The independent cart control system identifies throughput degradation of the industrial automation system based on the first amount of time, the second amount of time, the third amount of time, or the fourth amount of time, or any combination thereof, identifies a condition contributing to the throughput degradation of the industrial automation system, and generates and transmits a notification indicative of the throughput degradation of the industrial automation system and the condition contributing to the throughput degradation of the industrial automation system.

In a further embodiment, a method includes detecting a throughput degradation of an industrial automation system that includes one or more autonomous movers configured to move along a track. In response to detecting the throughput degradation of the industrial automation system, the method includes deploying one or more containers to one or more compute surfaces within the industrial automation system, retrieving, via the one or more containers, from one or more sensors disposed within the industrial automation system, data associated with the one or more movers as the one or more movers move around the track. The data includes a first amount of time for at least one of the one or more movers to move between two stations of a plurality of stations disposed along the track, a second amount of time for the at least one mover to settle at a station of the plurality of stations, a third amount of time for a respective robot at the station to prepare to perform a process, and a fourth amount of time for the respective robot to perform the process. The method further includes identifying, based on the first amount of time, the second amount of time, the third amount of time, or the fourth amount of time, or any combination thereof, a condition contributing to the throughput degradation of the industrial automation system, and generating and transmitting a notification indicative of the throughput degradation and the condition contributing to the throughput degradation.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

Figure 8:
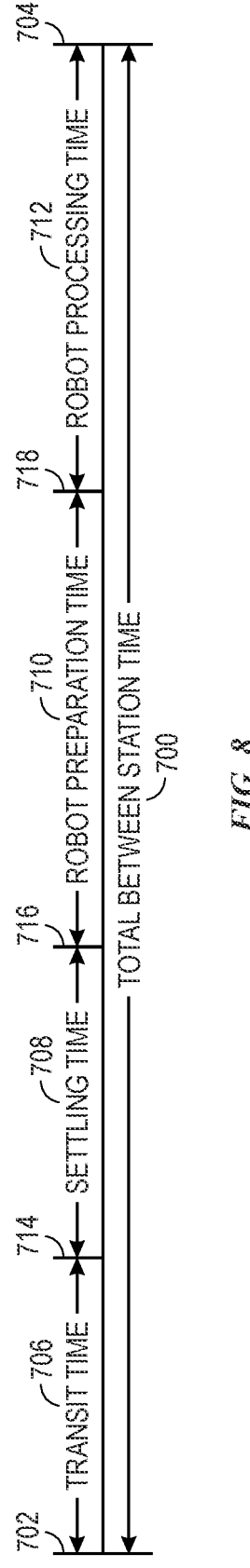
Figure 9:
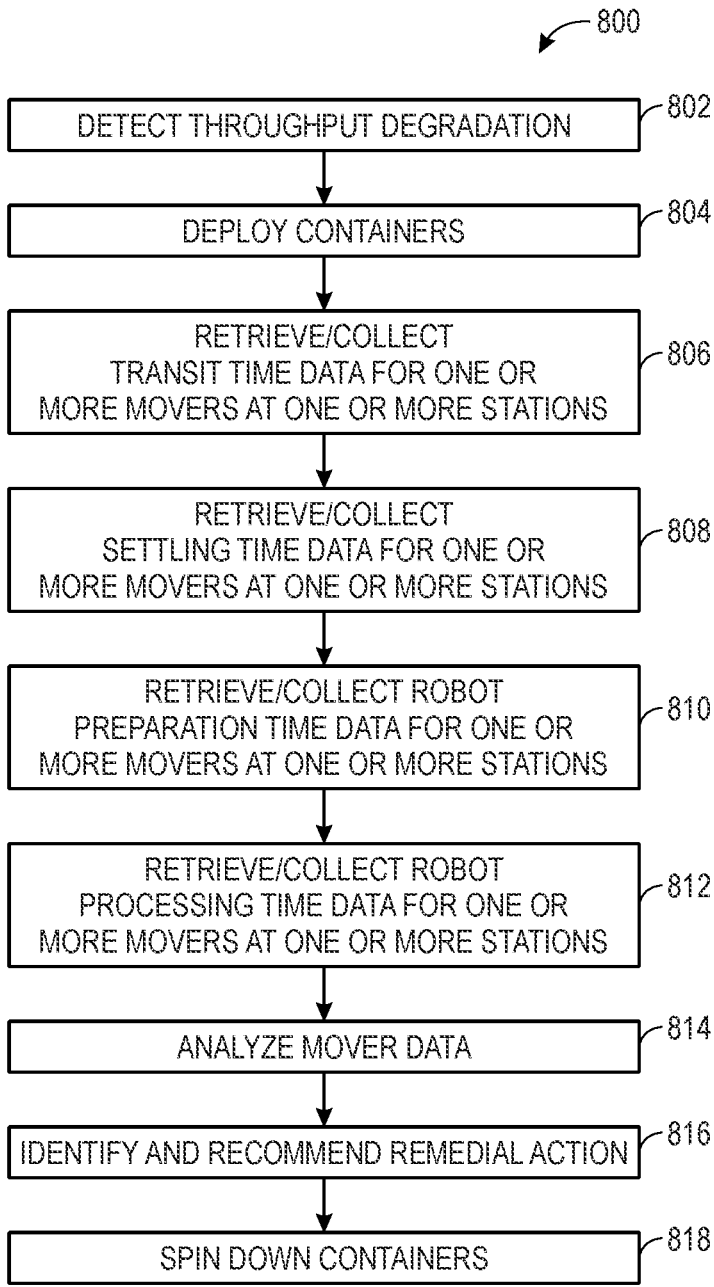

FIG. 8 is a schematic illustrating how total between station time, which extends from a time at which the mover assembly leaves the first station to a time at which the mover assembly leaves the second station, is divided into a transit time, a settling time, a robot preparation time, and a robot processing time, in accordance with an embodiment; and FIG. 9 is a flow chart of a process for using containers to identify contributing factors to throughput degradation, in accordance with an embodiment.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed toward using trends in mover travel times to identify and resolve conditions contributing to throughput degradation of an industrial automation system. Specifically, various aspects of an industrial automation system may be monitored for throughput degradation, performance degradation, or activity that deviates from expected or target operation. When throughput degradation is detected, mover travel time data may be collected to identify one or more factors and/or conditions that may be contributing to the throughput degradation. For example, data may be collected for transit time of a mover between stations, settling time once a mover arrives at a station, robot preparation time while a robot prepares to perform its process, and robot processing time as the robot performs its process. In some embodiments, data may be collected from sensors disposed throughout the industrial automation system. In some embodiments, data may be extracted from vehicle records generated by track segment controllers as movers travel along the track. In some embodiments, one or more containers may be deployed to compute surfaces throughout the industrial automation system to collect and/or analyze data. The collected data may be compared to target/benchmark data or compared to historical data and analyzed to determine conditions and/or factors that may be contributing to the throughput degradation. For example, conditions contributing to throughput degradation may include worn sections of track, driver deterioration, worn movers, etc. In some embodiments, remedial actions to address the identified conditions may be identified and recommended or automatically implemented. Data analysis may be performed via containers, segment controllers, high level controllers, programmable logic controllers, edge devices, cloud-based computing devices, or some combination thereof. In some embodiments, the analysis may include generating plots of collected data over time. Plots may be generated, for example, per mover, per station, per track section, per process performed, per product produced, for the entire process, and so forth.

Additional details with regard to independent cart throughput degradation identification and resolution will be discussed below with reference to FIGS. 1-9.

Figure 1:
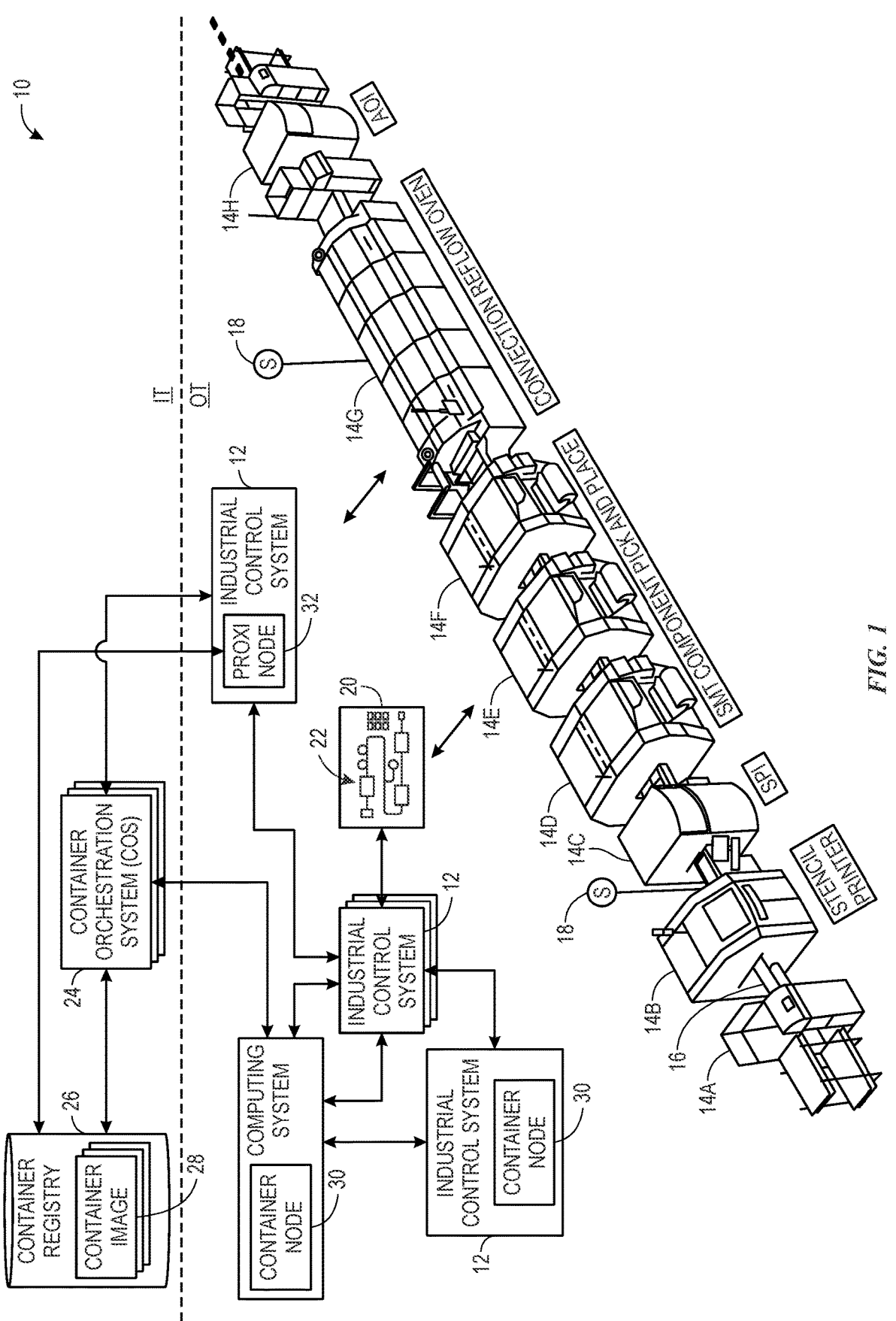
FIG. 1 is a perspective view of an example industrial automation system controlled by an industrial control system, in accordance with an embodiment.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process, such as silicon wafer manufacturing, as is depicted. The automated process may begin at a station 14A used for loading objects, such as substrates, into the industrial automation system 10 via a conveyor section 16. For example, one or more movers, such as independent carts, may transport the objects along the conveyor section 16 that includes a track to a station 14B to perform a first action, such a printing solder paste to the substrate via stenciling. As objects exit from the station 14B, the objects may be transported via the conveyor section 16 to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor, independent cart track segment controllers and/or high-level controllers). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
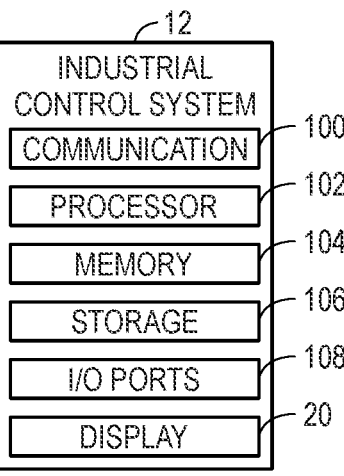
FIG. 2 is a block diagram of an example of the industrial control system of FIG. 1, in accordance with an embodiment.

With the foregoing in mind, FIG. 2 is a block diagram of an example industrial control system 12 that may be used with the embodiments described herein. The industrial control system 12 may include a communication component 100, a processor 102, a memory 104, a storage 106, input/output (I/O) ports 108, a display 20, and the like. The communication component 100 may be a wireless or wired communication component that facilitates communication between the container orchestration system 24 and the industrial control system 12, or any other suitable electronic device. The processor 102 may be any type of computer processor or microprocessor capable of executing computer-executable code. The processor 44 may also include multiple processors that may perform the operations described below.

The memory 104 and the storage 106 may be any suitable article of manufacture that may serve as media to store processor-executable code, data, or the like. These articles of manufacture may represent computer-readable media (i.e., any suitable form of memory or storage) that may store the processor-executable code used by the processor 102 to perform the presently disclosed techniques. The memory 104 and the storage 106 may represent non-transitory computer-readable media (e.g., any suitable form of memory or storage) that may store the processor-executable code used by the processor 102 to perform various techniques described herein. It should be noted that non-transitory merely indicates that the media is tangible and not a signal.

The I/O ports 108 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 102. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
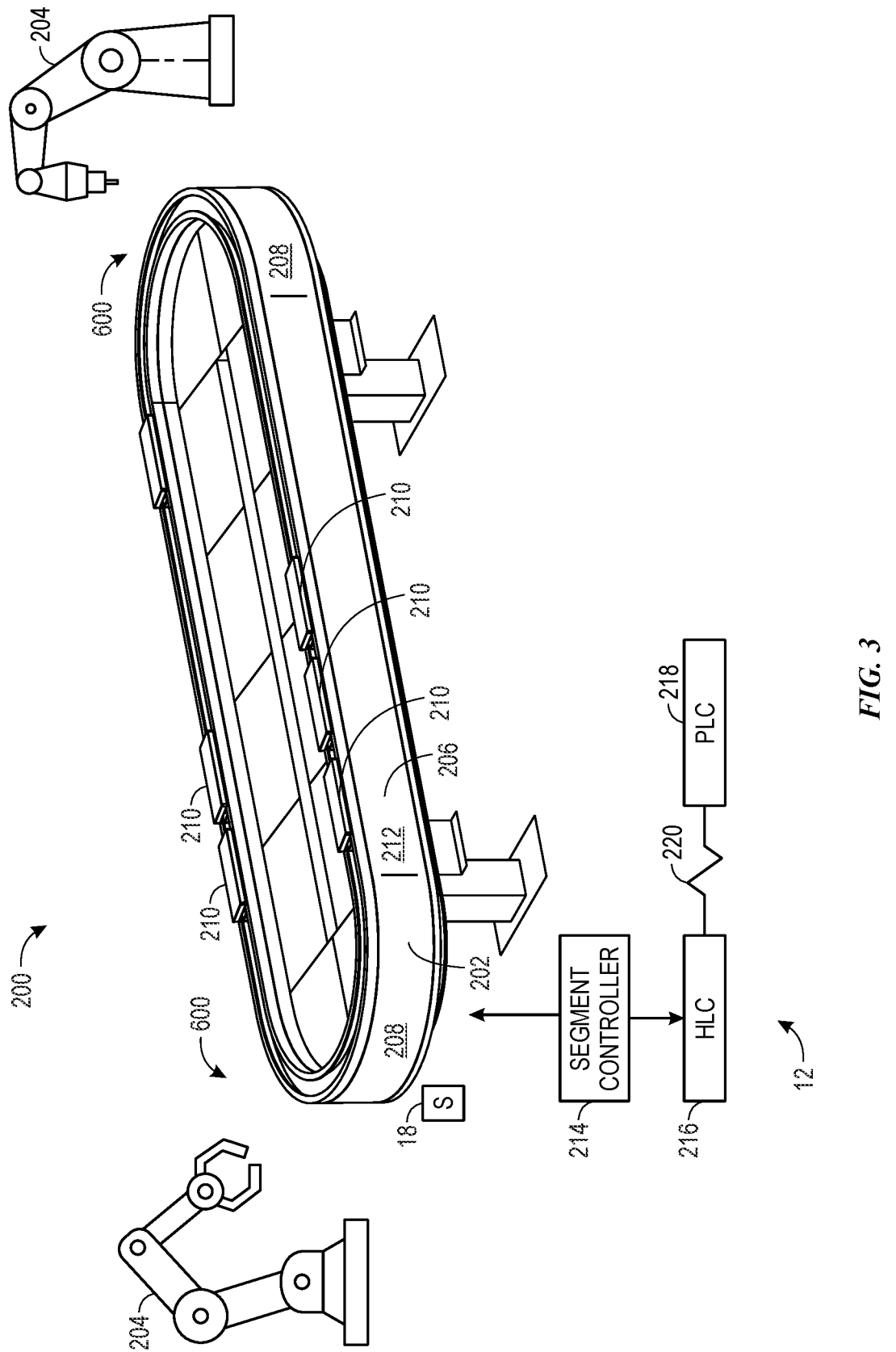
FIG. 3 is a perspective view of an embodiment of a mover system having mover assemblies positioned for movement along a track, which may be utilized in the industrial automation system of FIG. 1, in accordance with an embodiment.

Keeping the foregoing in mind, FIG. 3 is a perspective view of an embodiment of a mover system 200 (e.g., the conveyor section 16 of FIG. 1) that may be employed by the industrial automation system 10 and controlled by the industrial control system 12 to move articles or products around a track 202. As will be appreciated by those skilled in the art, in many applications, the mover system 200 may interoperate with one or more robots 204, machines, conveyers, control equipment, and so forth in an overall automation, packaging, material handling or other application. In the illustrated embodiment, the track 202 includes multiple straight track sections 206 and multiple curved track sections 208. These track sections 206, 208 may be generally self-contained and mountable in various physical configurations, such as in the oval illustrated in FIG. 3. It should be noted that other configurations are also possible as discussed below. The configurations may form closed loops of various shapes but may also include open-ended segments.

The mover system 200 may also include one or more mover assemblies 210, which may be mounted to and movable along the track 202. The position, velocity, acceleration, and/or higher order derivative parameters may be controllable for these mover assemblies 210. The mover assemblies 210 may interact with stationary elements in and around an outer periphery 212 of the track 202, although other configurations are envisaged. Each mover assembly 210 may include a mounting platform. Various tools, holders, support structures, loads, and so forth may be mounted to this mounting platform. The mover assemblies 210 themselves may be configured differently from those shown in order accommodate the various loads. While a horizontal configuration is illustrated in FIG. 3, other orientations may also be provided, such as ones in which the illustrated oval is generally stood on a side or end, or at any angle.

The control system 12 may position, accelerate, decelerate, and generally move the mover assemblies 210 under the influence of controlled magnetic and electromagnetic fields. For example, drive circuitry, such as a segment controller 214 of the control system 12 may provide signals to each track section 206, 208, and specifically to individual coils of the track sections 206, 208, to create electromotive forces that interact with magnets on the track sections 206, 208 to drive the mover assemblies 210 to specific locations and/or at specific velocity, accelerations, and so forth. In some embodiments, the segment controller may regulate motion states, control of movers, and anti-collision of movers. The segment controller 214 may typically include inverter circuitry that makes use of power electronic switches to provide drive power to the individual coils of each section in a controlled manner. In some embodiments, the segment controller 214 may be included in each individual track section 206, 208. Power and control circuitry, such as a high-level controller (HLC) 216 of the control system 12 may provide signals (e.g., move commands and/or various control signals) to the segment controller 214. A control/monitoring device, such as a PLC 218 may be linked to the mover system 200 by one or more networks 220. During operation, the PLC 218 may allow for coordination of the operation of the mover system 200 with other automation components, machine systems, manufacturing and material handling machines, and so forth. For example, the PLC 218 may receive data from the sensors 18 to detect various features, such as the location, position, orientation, velocity, acceleration, and so forth, of each individual mover assembly 210 and output control signals to the HLC 216 to control operation of the segment controller 214 to move the mover assemblies 210.

In certain embodiments, the PLC 218 may independently control each mover assembly 210. That is, the PLC 218 may regulate the position, velocity, and/or acceleration of each mover assembly 210 to move objects to intended locations while avoiding conflicts, collisions, and so forth. For example, the PLC 218 may cause the segment controller 214 to provide power to different coils of the track sections 206, 208 independently of one another (e.g., to control the coils that are energized and de-energized) to drive movement of the mover assemblies 210 separately from one another. The particular motion profile implemented by the HLC 216 may typically be implemented upon the design and commissioning of the mover system 200, depending upon the particular task to be performed. However, it should be understood that embodiments are envisaged in which the various tasks associated with controlling the mover assemblies 210 may be performed entirely by the segment controller 214, the HLC 216, and/or the PLC 218, or the tasks may be differently distributed among some combination of the segment controller 214, the HLC 216, and the PLC 218.

Figure 4:
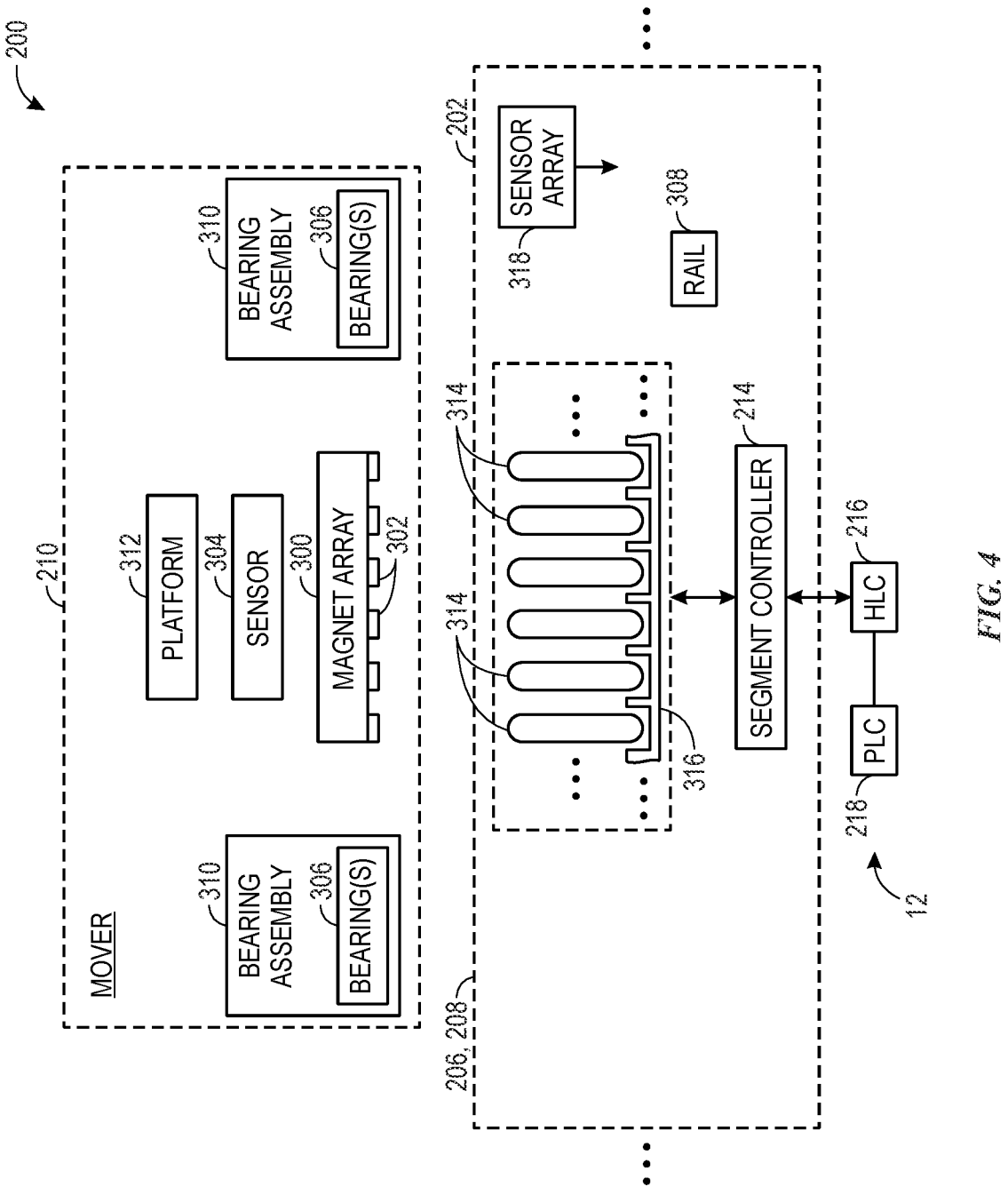
FIG. 4 is a schematic diagram of an embodiment of the mover assembly of the mover system of FIG. 3, in accordance with an embodiment.

FIG. 4 is a schematic diagram of an embodiment of the mover system 200 showing one track section 206, 208 and one mover assembly 210 positioned along the track 202. The track 202 illustrated in FIG. 4 may be the straight track section 206 or the curved track section 208, these two differing in their physical configuration. Each mover assembly 210 may include a magnet array 300 on which a number of magnets 302 may be mounted. The magnets 302 may be permanent magnets mounted such that a small air gap is provided between the coils of the track 202 while the mover assembly 210 is mounted to the track 202. The mover assembly 210 may also include a sensor 304 (e.g., the sensor 18) that may monitor various operations associated with the mover assembly 210. For example, the sensor 304 may include a position sensor, an accelerometer, an inertial measurement unit, a distance sensor, a force sensor, and the like that may monitor a position, velocity, acceleration, load, and so forth of the mover assembly 210. The sensor 304 may additionally include a single axis or multiple axes sensor that may monitor vibration of the mover assembly 210 in different axes. The mover assembly 210 may also include bearings 306 and associated components (e.g., rollers) that may interact with rails 308 of the track 202. The bearings 306 and rails 308 may allow the mover assembly 210 to remain securely attached to the track 202 while allowing relatively free movement of the mover assemblies 210 along the track 202 and supporting mechanical loads and forces encountered during motion. Each mover assembly 210 may include any number of bearing assemblies 310 to couple the bearings 306 to a housing of the mover assembly 210. Each mover assembly 210 may further include a respective platform 312 that may support an object for transportation while the mover assemblies 210 move along the track 202.

The track 202 may include a series of parallel coils 314 that are associated with a stator or armature 316. In currently contemplated embodiments, these coils 314 may be mounted into slots in the stator 316, and the stator 316 itself may be made of magnetic material formed into a stack of laminates and structured to allow for mounting within a housing of the track 202. The segment controller 214 may be included in each track section 206, 208 to allow for controlled power signals to be applied to the coils 314 in order to drive and position the mover assemblies 210 appropriately around the track 202. A sensor array 318 (e.g., including the sensor 18) is provided in each track section 206, 208. The sensor array 318 may provide feedback that can indicate the position of the mover assemblies 210 and can be used to derive velocity, acceleration, jerk, and other motion parameters. As an example, the sensor array 318 may include a vibration sensor secured to (e.g., at an underside of) the rail 308 to monitor vibration caused by movement of the mover assemblies 210 along the rail 308. In the illustrated embodiment, a number of track sections 206, 208 may be mounted end-to-end and interconnected with one another and/or with the HLC 216 to receive signals used to power the coils 314.

As will be appreciated by those skilled in the art, multiple track sections 206, 208, along with the magnet arrays 300 of the mover assemblies 210, may generally form the mover system 200. That is, electromotive force is generated by the controlled fields of the coils 314, and interaction between these fields and the magnetic fields of the magnet array 300 serve to drive the mover assembly 210 into desired positions, at desired speeds, and so forth. The coils 314 may be designed in accordance with various configuration strategies, such as ones having the coils 314 arranged around a periphery of the track 202, ones in which the coils 314 are generally planar (in a top or bottom position of the track 202), and so forth. The segment controller 214, the HLC 216, the PLC 218, or some combination of the controllers may selectively (e.g., independently) cause different coils 314 of different track sections 206, 208 to energize to drive independent movement of the mover assemblies 210, such as to drive a first mover assembly 210 to move at a first speed along a first track section 206, 208 and to drive a second mover assembly 210 to move at a second speed along a second track section 206, 208.

The PLC 218 may receive sensor data and analyze the data to determine whether the mover system 200 is operating as desired. For example, the PLC 218 may compare received sensor data with expected sensor data. Further, the PLC may be configured to use sensor data to calculate performance metrics and then compare the calculated performance metrics to expected/benchmark performance metric values, and/or plot calculated performance metrics over time and identify throughput degradation. A deviation between the received sensor data and the expected sensor data, or identified performance degradation, may indicate a deviation from an expected operation (e.g., an identified unexpected operation, an identified anomalous condition, or a discrepancy between an operational state and an expected operation state) of the mover system 200. The comparison between the received sensor data and the expected sensor data may be used to identify devices or machines that are operating in an expected or an unexpected manner. For example, the PLC 218 may identify devices, equipment, and/or machines for which maintenance or modifying operation may be appropriate based on the received sensor data.

Though embodiments shown and described with regard to FIGS. 3 and 4 correspond to independent cart technology (ICT) mover assemblies 210 in which the mover assembly is a passive component driven and actuated by the track 202, it should be understood that the present techniques are not intended to be limited to such embodiments and that the disclosed techniques may be similarly applied to other types of autonomous vehicle systems, such as autonomous mobile robots (AMRs), hybrid-electric vehicles, unmanned aerial vehicles (UAVs), and so forth, which may or may not move along a track.

Figure 5:
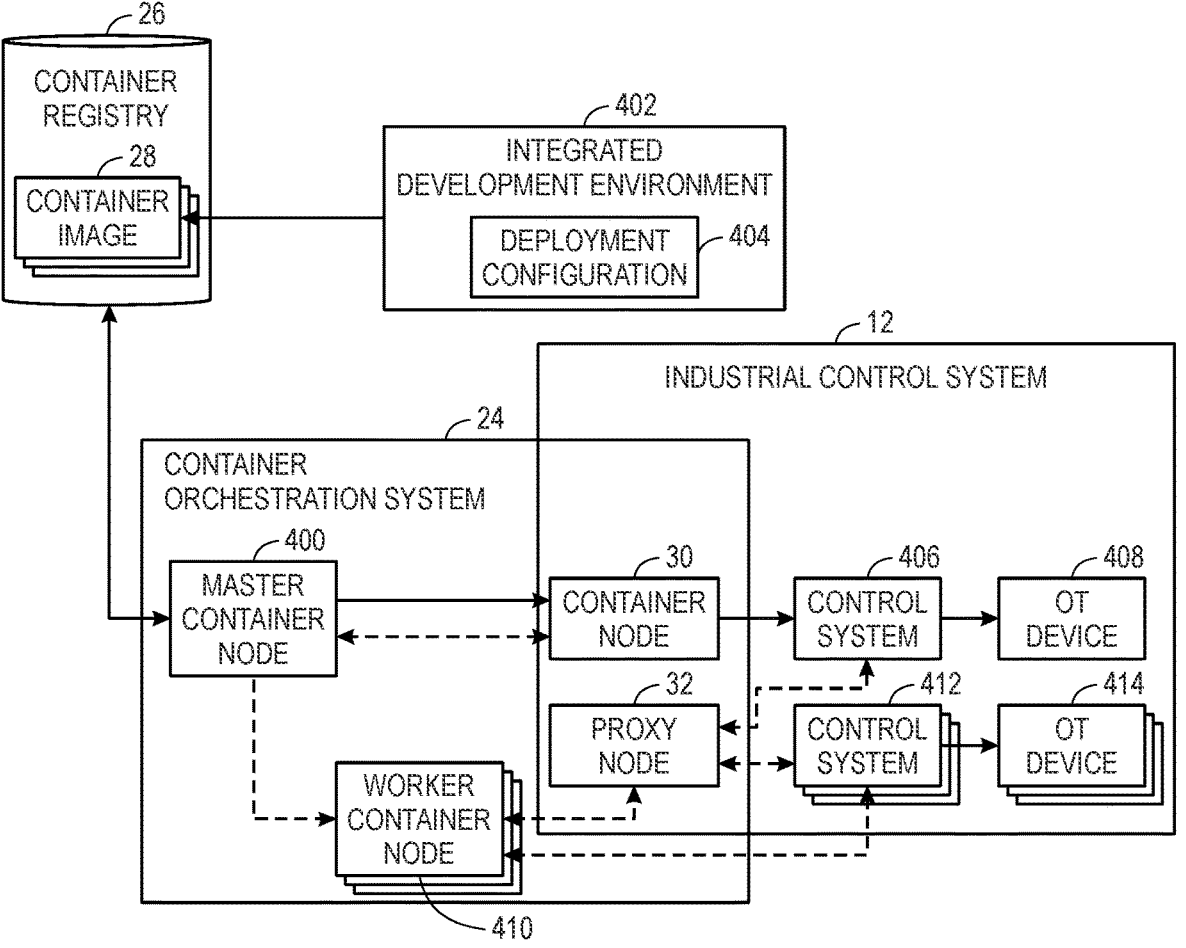
FIG. 5 is a block diagram of an example operational technology (OT) network that coordinates with a container orchestration system, in accordance with an embodiment.

In some embodiments, when a performance deviation or throughput degradation is detected, one or more containers may be deployed to collect data, analyze the collected data, and/or diagnose one or more conditions that may be contributing to the performance deviation or throughput degradation. With the foregoing in mind, FIG. 5 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 5, the container orchestration system 24 may include a master node 400 that may execute control plane processes for the container orchestration system 24. The control plane processes may include the processes that enable the container orchestration system 24 to coordinate operations of the container nodes 30 to meet the desired states. As such, the master container node 400 may execute an applications programming interface (API) for the container orchestration system 24, a scheduler component, core resource controllers, and the like. By way of example, the master container node 400 may coordinate all of the interactions between nodes of the cluster that make up the container orchestration system 24. Indeed, the master container node 400 may be responsible for deciding the operations that will run on container nodes 30 including scheduling workloads (e.g., containerized applications), managing the workloads' lifecycle, scaling, and upgrades, managing network and storage resources for the workloads, and the like. The master container node 400 may run an API server to handle requests and status updates received from the container nodes 30.

By way of operation, an integrated development environment (IDE) tool 402 may be used by an operator to develop a deployment configuration file 404. As mentioned above, the deployment configuration file 404 may include details regarding the containers, the pods, constraints for operating the containers/pods, and other information that describe a desired state of the containers specified in the deployment configuration file 404. In some embodiments, the deployment configuration file 404 may be generated in a YAML file, a JSON file, or other suitable file format that is compatible with the container orchestration system 24. After the IDE tool 402 generates the deployment configuration file 404, the IDE tool 402 may transmit the deployment configuration file 404 to the container registry 26, which may store the file along with container images 28 representative of the containers stored in the deployment configuration file 404.

In some embodiments, the master container node 400 may receive the deployment configuration file 404 via the container registry 26, directly from the IDE tool 402, or the like. The master container node 400 may use the deployment configuration file 404 to determine a location to gather the container images 28, determine communication protocols to use to establish networking between container nodes 30, determine locations for mounting storage volumes, locations to store logs for the containers, and the like.

Based on the desired state provided in the deployment configuration file 404, the master container node 400 may deploy containers to the container host nodes 30. That is, the master container node 400 may schedule the deployment of a container based on constraints (e.g., CPU or memory availability) provided in the deployment configuration file 404. After the containers are operating on the container nodes 30, the master container node 400 may manage the lifecycle of the containers to ensure that the containers specified by the deployment configuration file 404 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as Factory Talk LiveData, EtherNet/IP. Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a PLC that cannot support an operating system (e.g., Linux) for receiving and/or implementing requested operations issued by the container orchestration system 24. However, the PLC may perform certain operations that may be mapped to certain container events. As such, the container node 30 may include software and/or hardware components that may map certain events or commands received from the master container node 400 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 406 (e.g., PLC) that coordinates the OT operations for an OT device 414 in the industrial control system 12. The control system 406 may include a controller, such as a PLC, an HLC, a programmable automation controller (PAC), or any other controller that may monitor, control, and operate an industrial automation device or component.

The industrial automation device or component may correspond to an OT device 408. The OT device 408 may include any suitable industrial device that operates in the OT space. As such, the OT device 408 may be involved in adjusting physical processes being implemented via the industrial system 10. In some embodiments, the OT device 408 may include motor control centers, motors, HMIs, operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 408 may also be related to various industrial equipment such as mixers, machine conveyors, tanks, skids, specialized original equipment manufacturer machines, and the like. The OT device 408 may also be associated with devices used by the equipment such as scanners, gauges, valves, flow meters, and the like. In one embodiment, every aspect of the OT device 408 may be controlled or operated by the control system 412.

In the present embodiments described herein, the control system 406 may thus perform actions based on commands received from the container node 30. By mapping certain container lifecycle states into appropriate corresponding actions implementable by the control system 406, the container node 30 enables program content for the industrial control system 12 to be containerized, published to certain registries, and deployed using the master container node 400, thereby bridging the gap between the IT-based container orchestration system 24 and the OT-based industrial control system 12.

In some embodiments, the container node 30 may operate in an active mode, such that the container node may invoke container orchestration commands for other container nodes 30. For example, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 406 that is configured (e.g., partitioned), such that the control system 406 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 408 based on IT data. For instance, the proxy node 32 may acquire OT device tree data, state data for an OT device, descriptive metadata associated with corresponding OT data, versioning data for OT devices 408, certificate/key data for the OT device, and other relevant OT data via OT communication protocols. The proxy node 32 may then translate the OT data into IT data that may be formatted to enable the master container node 400 to extract relevant data (e.g., machine state data) to perform analysis operations and to ensure that the container orchestration system 24 and the connected control systems 406 are operating at the desired state. Based on the results of its scheduling operations, the master container node 400 may issue supervisory control commands to targeted OT devices via the proxy nodes 32, which may translate and forward the translated commands to the respective control system 406 via the appropriate OT communication protocol.

In addition, the proxy node 32 may also perform certain supervisory operations based on its analysis of the machine state data of the respective control system 406. As a result of its analysis, the proxy node 32 may issue commands and/or pods to other nodes that are part of the container orchestration system 24. For example, the proxy node 32 may send instructions or pods to other worker container nodes 410 that may be part of the container orchestration system 24. The worker container nodes 410 may corresponds to other container nodes 30 that are communicatively coupled to other control systems 412 for controlling other OT devices 414. In this way, the proxy node 32 may translate or forward commands directly to other control systems 412 via certain OT communication protocols or indirectly via the other worker container nodes 410 associated with the other control systems 412. In addition, the proxy node 32 may receive replies from the control systems 412 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 414 in a coordinated fashion. That is, the proxy node 32 may enable the container orchestration system to coordinate the activities of multiple control systems 406 and 412 to achieve a collection of desired machine states for the connected OT devices 408 and 414.

Figure 6:
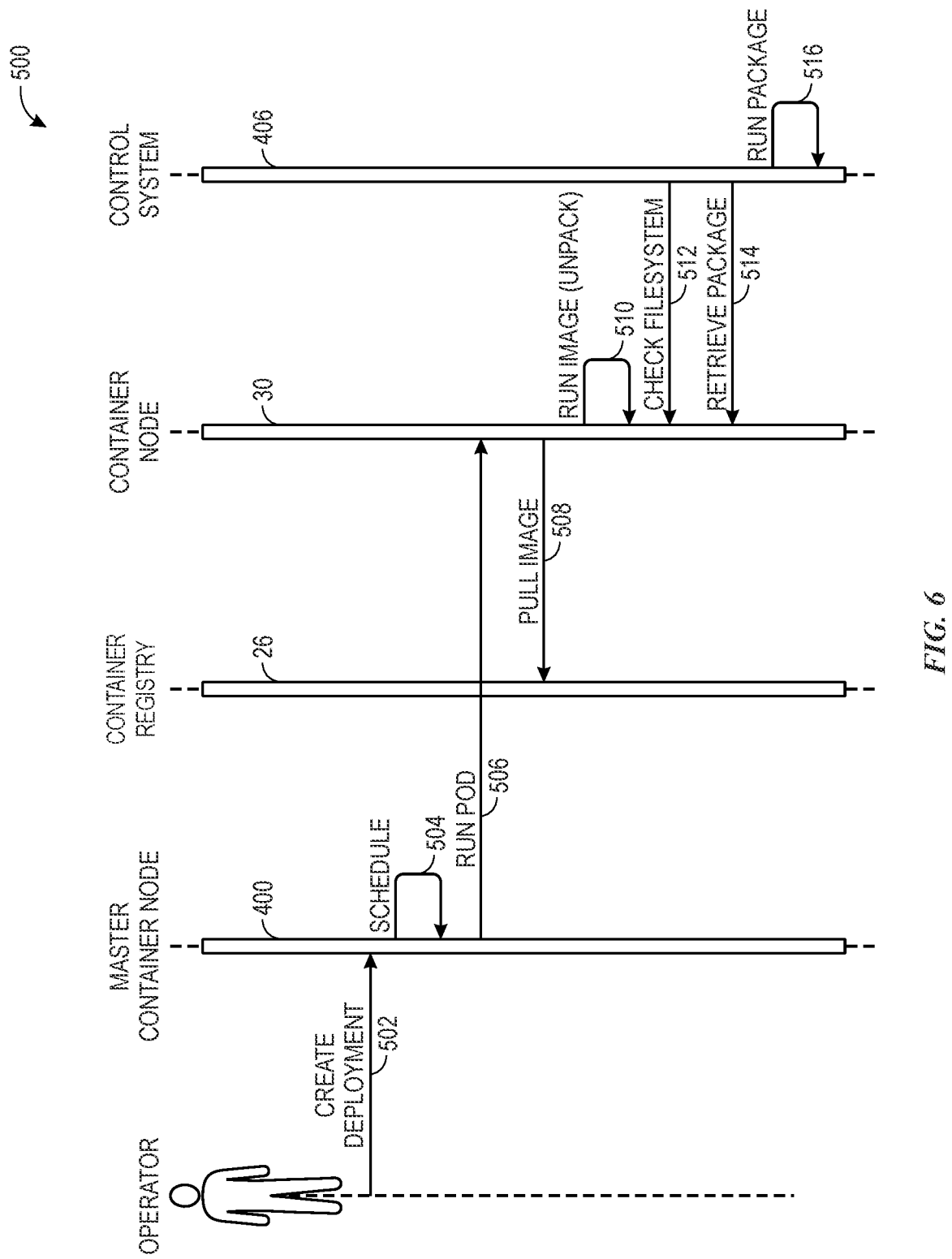
FIG. 6 is a sequence diagram illustrating the deployment of container pods to industrial control systems in the OT network of FIG. 5, in accordance with an embodiment.

FIG. 6 illustrates a sequence diagram 500 that tracks the deployment of a container using the master container node 400 and the container node 30 described above with reference to FIG. 5. At step 502, the IDE tool 402 may create a deployment of the deployment configuration file 404 to the master container node 400. After receiving the deployment configuration file 404, the master container node 400 may identify a container node 30 that may fit the constraint specifications (e.g., memory, CPU availability) provided in the deployment configuration file 404. That is, the master container node 400 performs scheduling operations that involve checking the state data for each node of the container orchestration system 24, determining whether a suitable node exists for the constraints provided in the deployment configuration file 404, and the like.

After identifying the suitable container node, at step 504, the master container node 400 may schedule the deployment of the container to the respective container node 30. At step 506, the master container node 400 may deploy a pod to the container node 30, which may cause the container node 30 to retrieve a container image 28 from the container registry 26 at step 508. In this way, the container node 30 is configured to receive pods from the master container node 400 and execute the pods, although the control system 406 of the industrial control system 12 may not be able to execute the pod. After pulling the container image 28 from the container registry 26, the container node 30 may, at step 510, run the container image 28 or unpack the container image 28 and store an application or operation executable by the control system 406 in a file system. At step 512, the control system 406 may check the file system of the container node 30 for updates or newly stored packages. At step 514, the control system 406 may retrieve the stored package that may include the container scheduled for operation by the control system 406 by the master container node 400 at step 504. At step 516, the control system 406 may execute the package retrieved from the file system of the container node 30. The container node 30 may then monitor the operations of the package being executed on the control system 406, the state (e.g., memory, CPU usage) of the control system 406 and send updates to the master container node 400. If the container node 30 sends an update indicative of the package no longer executing the package, the master container node 400 may schedule deployment of another pod to another container node 30 for execution to maintain the desired state.

Figure 7:
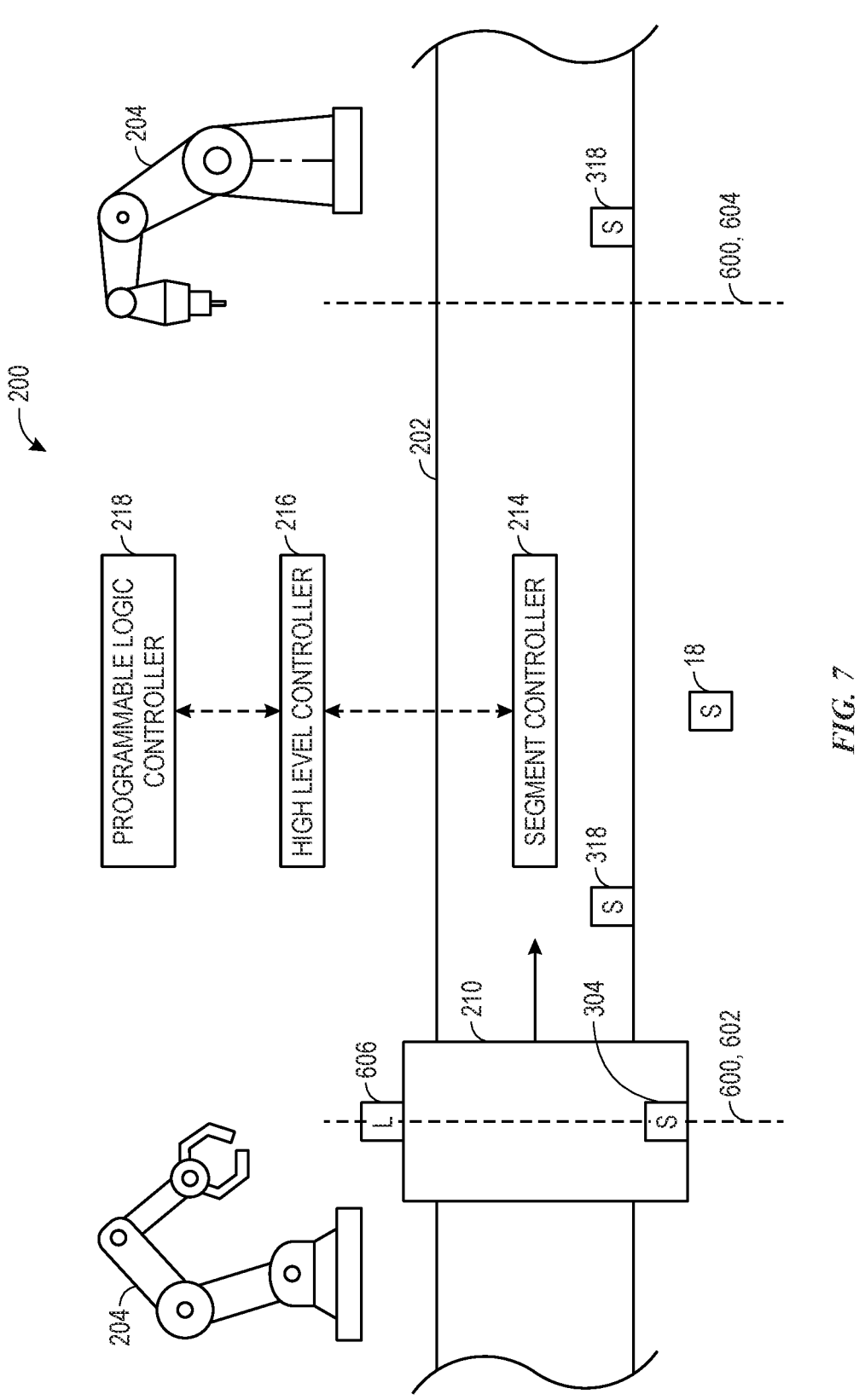
FIG. 7 is a schematic illustrating one of the mover assemblies of FIG. 3 progressing from a first station to a second station, in accordance with an embodiment.

Returning to FIG. 3, mover assemblies 210 may be controlled to move around the track 202, progressing through a sequence of stations 600 at which one or more robots 204 perform one or more operations on the load being carried by the respective mover assembly. For example, a robot 204 at a particular station 600 may be configured to fill a bottle with product, seal a vessel, apply a fastener, install a part, perform an inspection, count items, pick up an item, deposit an item, or perform some other operation. FIG. 7 is a schematic illustrating a mover assembly 210 progressing from a first station 602 to a second station 604. As shown, a robot 204 performs an operation on a load 606 carried by the mover assembly 210 while the mover assembly is stationary at the first station 602. The load 606 may include a piece of product, such as a part, a molded/extruded object, a widget, etc., a vessel that holds product, such as a can, a bottle, a tub, a bag, a tube, etc., or some other item. A signal may be generated when the robot 204 completes the process.

The signal may be generated by the robot 204 itself, the PLC 218, the HLC 216, or some other device. When the signal indicating that the robot 204 has completed the process has been received by the PLC 218, the HLC 216, and/or the segment controller 214, or a set amount of time has elapsed, the segment controller 214 may actuate the mover assembly 210 to depart the first station 602 and travel along the track 202 toward the second station 604. The time elapsed between the mover assembly 210 leaving the first station 602 and arriving at the second station 604 may be referred to as the transit time. After the mover assembly 210 arrives at the second station 604 and stops moving along the track 202, the mover system 200 may pause while the load 606 settles. This period of time may be referred to as settling time. For example, if the load 606 includes a vessel carrying an amount of liquid, or some other item that may move while the mover assembly is in motion, it may take a period of time for the load 606 to stop moving even after the mover assembly 210 has come to a stop. In some embodiments, the segment controller 214 and/or the mover assembly 210 may generate and transmit a vehicle report with various information, such as data identifying the mover assembly 210, data identifying the load 606, data associated with the movement of the mover assembly, and so forth. After the load 606 has settled, time may pass while the robot 204 prepares to perform the process on the load 606. This period of time may be referred to as the robot preparation time. After the robot 204 preparation, the robot 204 performs the process. The time that passes while the robot 204 performs the process may be referred to as the robot processing time. When the robot 204 has completed the process, a signal may be generated that the process has been completed, or it may be assumed that the process has completed after a set period of time has elapsed. The segment controller 214 may then actuate the mover assembly 210 to depart the second station for a subsequent station.

As shown in FIG. 7, one or more sensors 18, 304, 318 may be disposed throughout the mover system 200 and collect data from mover assemblies 210 moving along the track 202. As shown, some sensors 304 may be mounted to or incorporated within mover assemblies 210 and collect data from the respective mover assembly as it moves along the track 202. Other sensors 318 may be mounted to or incorporated within track sections 206, 208 and collect data as mover assemblies 210 travel along the track 202 past the sensors 318. Further, sensors 18 may otherwise be disposed throughout the mover system 200, either in a stationary fashion or a mobile fashion, and configured to sense various aspects of mover assemblies 210 moving around the track 202. In some embodiments, the sensors 18, 304, 318 may be dual process sensors that are also used in providing feedback control of mover assemblies 210, robots 204, or other components of the industrial automation system. Accordingly, such sensors collect data associated with mover assemblies 210 that pass within a sensing proximity of the sensors 18. The various sensors 18, 304, 318 may continuously or periodically transmit collected data to a data collection component, such as a container, an edge device, a compute surface of an automation device, an HLC 216, a PLC 218, a cloud computing device, etc. In some embodiments, data may be received and transmitted by a chain of components until the data is received by the PLC 218.

When a performance degradation, a throughput degradation, data diverging from some expected value, or some anomaly is detected, one or more containers may be deployed to one or more compute surfaces in or around the mover system 200. For example, one or more data acquisition containers may be deployed to collect data from various sensors 18, 304, 318 and and/or around the mover system 200. One or more data analysis containers may be deployed to analyze collected data. This may include, for example, filtering collected data, processing collected data, applying one or more algorithms to collected data, inputting the collected data to one or more machine learning models or classifiers. In some embodiments, the one or more data analysis containers may perform multiple levels of data analysis. In some embodiments, the one or more deployed containers may also be configured to diagnose one or more conditions contributing to the performance degradation, throughput degradation, data diverging from some expected value, and/or the anomaly and recommend and/or automatically implement one or more remedial actions to address the performance degradation, throughput degradation, data diverging from some expected value, and/or the anomaly. In some embodiments, specific containers associated with specific conditions and/or failure modes may be deployed within the industrial automation system when those conditions and/or failure modes are detected. Once deployed, these containers may be configured to identify, recommend, and/or automatically implement remedial actions to address the detected conditions and/or failure modes.

For example, data may be collected from multiple mover assemblies 210 as the mover assemblies 210 travel around the track between stations 600. For each move between stations 600 for a particular mover assembly 210, transit time, settling time, robot preparation time, and robot processing time may be monitored and/or calculated and plotted over time in a time series graph. A given time series graph may be for a particular track section 206, 208, station 600, or mover assembly 210. The time series graph for a particular track section 206, 208 or station 600 may consider all of the mover assemblies 210 that pass through the track section 206, 208 or station 600, or may consider only a single mover assembly 210 (or a subset of mover assemblies 210) as the mover assemblies 210 travel laps around the track 202 and pass through the track section 206, 208 or station 600 multiple times. Correspondingly, the time series graph for a particular mover assembly 210 may consider all of the tracks section 206, 208 or stations 600, the mover assembly 210 passes through or may consider only a single track section 206, 208 or station 600 (or a subset of track sections 206, 208 or stations 600) as the mover assembly 210 travels laps around the track 202 and passes through the track sections 206, 208 or stations 600 multiple times. Collected data may be used to calculate time metrics and analyze trends between stations, for an entire process, per station, per vehicle, per process performed, per product produced, etc. Accordingly, if the data indicates that multiple mover assemblies 210 are slowing down on a particular track section 206, 208, it can be deduced that there is a problem with the particular track section 206, 208 and that maintenance or service should be performed on the identified track section 206, 208 (e.g., track wear, driver deterioration, etc.). Similarly, if a particular mover assembly 210 is moving slower than other mover assemblies 210 through multiple track sections 206, 208, it can be deduced that there is a problem with the particular mover assembly 210 and that maintenance or service should be performed on the identified mover assembly 210 (mover wear, etc.).

FIG. 8 is a schematic illustrating how total between station time 700, which extends from a time 702 at which the mover assembly leaves a first station to a time 704 at which the mover assembly leaves a second station, is divided into a transit time 706, a settling time 708, a robot preparation time 710, and a robot processing time 712. As shown, the transit time 706 is the time elapsed between the moment 702 the mover assembly leaves the first station and the moment 714 the mover comes to a stop at the second station 604. The settling time 708 is the time elapsed between the moment 714 the mover comes to a stop at the second station 604, and the moment 716 the load is determined to have settled and the robot at the second station begins preparing to perform its process. In some embodiments, a sensor may be used to determine when a load has settled, whereas in other embodiments, a load may be assumed to have settled after some period of time has passed. The robot preparation time 710 is the time elapsed between the moment 716 the load is determined to have settled and the robot at the second station begins preparing to perform its process, and the moment 718 the robot actually begins its process. The robot processing time 712 is the time elapsed between the moment 718 the robot at the second station begins its process and the moment 704 the mover assembly leaves the second station.

As previously described, in some embodiments, these times may be determined based on data collected from one or more sensors disposed throughout the mover system. Additionally, in some embodiments, times may be determined based on data extracted from a vehicle record that is generated and/or transmitted between segment controllers when a mover assembly arrives at a station. The vehicle record may include, for example, transient time, settle time, mover position, mover speed, mover order information. In some embodiments, vehicle records may be provided to HLCs and/or PLCs at periodic time intervals (e.g., 100 ms intervals) such that the HLCs and/or PLCs know the locations of the various mover assemblies. Processing of collected data to calculate the various time metrics, compare time metrics to target/benchmark data, and monitor trends in various time metrics over time may be done by one or more segment controllers, one or more HLCs, one or more PLCs, one or more edge devices, one or more cloud computing devices, one or more containers, one or more compute surfaces of an automation device, or some combination thereof.

FIG. 9 is a flow chart of a process 800 for identifying and resolving throughput degradation. At block 802, a throughput degradation is detected. The throughput degradation may be detected based on data collected from one or more sensors in and/or around the mover system, data extracted from one or more vehicle records, or may be noticed and flagged by a user or operator. In other embodiments, rather than a throughput degradation, a performance degradation, a deviation between the received sensor data and the expected sensor data, or a deviation from an expected operation (e.g., an identified unexpected operation, an identified anomalous condition, or a discrepancy between an operational state and an expected operation state) of the mover system may be detected. For example, when a monitored value crosses some threshold value (e.g., exceeds threshold, falls below threshold), or is outside of some expected range, it may be determined that the system is not operating as expected and that additional collection should be performed.

At block 804, one or more containers may be deployed to compute surfaces in and/or around the mover system. For example, one or more data acquisition containers may be deployed to compute surfaces in/around the mover system configured to collect data from the mover system. For example, data acquisition containers may be deployed to industrial automation devices, controllers, edge devices, computing devices, tablets, mobile devices, a segment controller, an HLC, a PLC, etc., and configured to collect data associated with movers traveling around the track.

At 806, data may be collected from the mover system via the one or more data acquisition containers that is indicative of transit time of one or movers between one or more stations. Additionally or alternatively, in some embodiments, data indicative of transit time may be extracted from a vehicle record. As previously described, transit time is the time elapsed between the moment the mover assembly leaves one station and the moment the mover comes to a stop at the subsequent station.

At block 808, data may be collected from the mover system via the one or more data acquisition containers that is indicative of settling time of one or movers at one or more stations. Additionally or alternatively, in some embodiments, data indicative of settling time may be extracted from a vehicle record. As previously described, settling time is the time elapsed between the moment the mover comes to a stop at a station, and the moment the load is determined to have settled and the robot at the station begins preparing to perform its process. In some embodiments, a sensor may be used to determine when a load has settled, whereas in other embodiments, a load may be assumed to have settled after some period of time has passed.

At block 810, data may be collected from the mover system via the one or more data acquisition containers that is indicative of robot preparation time. Additionally or alternatively, in some embodiments, data indicative of robot preparation time may be extracted from a vehicle record. The robot preparation time is the time elapsed between the moment the load is determined to have settled, or assumed to have settled based on some amount of time elapsing, during which the robot prepares to perform its process, and the moment the robot actually begins its process.

At block 812, data may be collected from the mover system via the one or more data acquisition containers that is indicative of robot processing time. Additionally or alternatively, in some embodiments, data indicative of robot processing time may be extracted from a vehicle record. The robot processing time is the time elapsed between the moment the robot at the second station begins its process and the moment the mover assembly leaves the second station.

At block 814, the collected data is analyzed. In some embodiments, the analysis may be performed by a data analysis container, whereas in other embodiments, the data may be analyzed, or at least pre-processed by the one or more data acquisition containers. In further embodiments, the analysis may be performed by one or more of the components of the mover system. For example, the analysis may be performed by one or more industrial automation devices, controllers, edge devices, computing devices, tablets, mobile devices, a segment controller, an HLC, a PLC, etc. The analysis may include, for example, applying one or more machine learning models, one or more machine learning classifiers, one or more algorithms, one or more scripts, etc. Specifically, the analysis may include, for example, identifying and/or calculating transit time, settling time, robot preparation time, and robot processing time in the collected data for each mover's visits at each of the stations visited during the time that data was being collected. Times for transit time, settling time, robot preparation time, and robot processing time may be analyzed and/or plotted for each mover, for each station, between stations, for the entire process, per process, per product, etc. In some embodiments, generated plots may be displayed via a GUI (e.g., a dashboard). Initially, the analysis may include comparing collected data to expected, target, or benchmark values. However, as time goes on and more data is collected, the analysis may tend more toward identifying and considering trends in the collected data over time, such as is a monitored value trending upward, downward, or remaining relatively constant over days, weeks, and/or months? The analysis may also include identifying one or more conditions that may be contributing to the throughput degradation, performance degradation, deviation between the received sensor data and the expected sensor data, or deviation from an expected operation (e.g., an identified unexpected operation, an identified anomalous condition, or a discrepancy between an operational state and an expected operation state). For example, the analysis may include identifying problems with particular components (e.g., track wear, driver deterioration, etc.). For example, if the data indicates that multiple mover assemblies are slowing down on a particular track section it can be deduced that there is a problem with the particular track section and that maintenance or service should be performed on the identified track section (e.g., track wear, driver deterioration, etc.). Similarly, if a particular mover assembly is moving slower than other mover assemblies through multiple track sections it can be deduced that there is a problem with the particular mover assembly and that maintenance or service should be performed on the identified mover assembly (mover wear, etc.). At block 816, one or more remedial actions to address the identified may be identified and/or recommended. The one or more remedial actions may be identified by a container or by a device involved in the analysis, such as one or more industrial automation devices, controllers, edge devices, computing devices, tablets, mobile devices, a segment controller, an HLC, a PLC, etc. The remedial actions may be determined via a lookup table, a script, an algorithm, a machine learning model, accessing a database, following a workflow or decision tree, analysis of historical data, and so forth. The remedial actions may include, for example, replacing and/or servicing components or parts (e.g., bearings, mover assemblies, drivers, track sections, performing a maintenance operation, replacing oil or lubrication, recalibrating a component, updating software/firmware, and so forth.

In some embodiments, the remedial actions may be automatically implemented. For example, certain remedial actions may be pre-approved for automatic implementation, or the remedial actions may be determined to be of small enough risk to justify automatic implementation. In other embodiments, one or more remedial actions may be proposed to a user for approval/selection before implementation. Further, other remedial actions (e.g., replacing a part, scheduling service/maintenance) may be suggested to a user for the user to carry out themselves or oversee someone else (e.g., a technician) carry out. At block 818, after the condition has been resolved (e.g., a confirmation is received that the condition has been resolved and the mover system is operating as expected), the container may be spun down or otherwise stopped so the resources utilized by the container may be made available for other functions.

Embodiments of the present disclosure are generally directed toward using trends in mover travel times to identify and resolve conditions contributing to throughput degradation of an industrial automation system. Specifically, various aspects of an industrial automation system may be monitored for throughput degradation, performance degradation, or activity that deviates from expected or target operation. When throughput degradation is detected, mover travel time data may be collected to identify one or more factors and/or conditions that may be contributing to the throughput degradation. For example, data may be collected for transit time of a mover between stations, settling time once a mover arrives at a station, robot preparation time while a robot prepares to perform its process, and robot processing time as the robot performs its process. In some embodiments, data may be collected from sensors disposed throughout the industrial automation system. In some embodiments, data may be extracted from vehicle records generated by track segment controllers as movers travel along the track. In some embodiments, one or more containers may be deployed to compute surfaces throughout the industrial automation system to collect and/or analyze data. The collected data may be compared to target/benchmark data or compared to historical data and analyzed to determine conditions and/or factors that may be contributing to the throughput degradation. For example, conditions contributing to throughput degradation may include worn sections of track, driver deterioration, worn movers, etc. In some embodiments, remedial actions to address the identified conditions may be identified and recommended or automatically implemented. Data analysis may be performed via containers, segment controllers, high level controllers, programmable logic controllers, edge devices, cloud-based computing devices, or some combination thereof. In some embodiments, the analysis may include generating plots of collected data over time. Plots may be generated, for example, per mover, per station, per track section, per process performed, per product produced, for the entire process, and so forth. In some embodiments, remedial actions to address the identified condition may be identified and recommended or automatically implemented.

By using the disclosed techniques, changes in throughout, whether they occur gradually over a long period of time or rapidly over a short period of time, may be detected and accounted for quickly, thus reducing down time and resources spent on human inspections and subject matter experts diagnosing causes of throughput degradation and developing a remedial action. Accordingly, use of the disclosed techniques may cause an industrial automation system to run more efficiently, with less down time, and increased production.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more movers configured to move along a track of an industrial automation system; and
a computing device, comprising one or more hardware processors, wherein the computing device is configured to:

receive data associated with the one or more movers as the one or more movers move around the track, wherein the data comprises:

a first amount of time for at least one of the one or more movers to move between two stations of a plurality of stations disposed along the track;

a second amount of time for the at least one mover to settle at a station of the plurality of stations;

a third amount of time for a respective robot at the station to prepare to perform a process; and a fourth amount of time for the respective robot to perform the process;

identify throughput degradation based on the first amount of time, the second amount of time, the third amount of time, or the fourth amount of time, or any combination thereof.

2. The system of claim 1, wherein the one or more movers comprise one or more independent carts.

3. The system of claim 1, wherein the one or more movers comprise one or more autonomous mobile robots (AMRs), one or more hybrid-electric vehicles (HEVs), or one or more unmanned aerial vehicles (UAVs), or any combination thereof.

4. The system of claim 1, comprising:

one or more sensors configured to collect the data associated with the one or more movers as the one or more movers move around the track; and a mover control system configured to use the data collected by the one or more sensors to control the one or more movers.

5. The system of claim 1, wherein the computing device comprises a segment controller, a high level controller (HLC), a programmable logic controller (PLC), an edge device, or a cloud computing device, or any combination thereof.

6. The system of claim 1, wherein the computing device is configured to identify a condition of the industrial automation system contributing to the throughput degradation.

7. The system of claim 6, wherein the condition comprises a worn section of the track.

8. The system of claim 6, wherein the condition comprises a deteriorating driver of the track.

9. The system of claim 6, wherein the condition comprises a worn mover of the one or more movers.

10. The system of claim 6, wherein the computing device is configured to identify a remedial action to remedy the condition of the industrial automation system contributing to the throughput degradation.

11. An independent cart control system configured to:

receive data associated with one or more independent carts of an industrial automation system as the one or more independent carts move around a track, wherein the data comprises:

a first amount of time for at least one of the one or more independent carts to move between two stations of a plurality of stations disposed along the track;

a second amount of time for the at least one independent cart to settle at a station of the plurality of stations;

a third amount of time for a respective robot at the station to prepare to perform a process; and a fourth amount of time for the respective robot to perform the process;

identify throughput degradation of the industrial automation system based on the first amount of time, the second amount of time, the third amount of time, or the fourth amount of time, or any combination thereof;

identify a condition contributing to the throughput degradation of the industrial automation system; and generate and transmit a notification indicative of the throughput degradation of the industrial automation system and the condition contributing to the throughput degradation of the industrial automation system.

12. The independent cart control system of claim 11, wherein identifying the throughput degradation comprises identifying one or more trends in the first amount of time, the second amount of time, the third amount of time, or the fourth amount of time, or any combination thereof.

13. The independent cart control system of claim 11, comprising a segment controller, wherein at least a portion of the data associated with the one or more independent carts of the industrial automation system as the one or more independent carts move around the track is received via a vehicle record generated by the segment controller.

14. The independent cart control system of claim 13, comprising an additional segment controller, wherein the vehicle record is transmitted from the segment controller to the additional segment controller.

15. The independent cart control system of claim 11, wherein identifying the throughput degradation comprises generating one or more plots for the first amount of time, the second amount of time, the third amount of time, or the fourth amount of time, or any combination thereof.

16. The independent cart control system of claim 15, wherein the one or more plots comprise respective plots for one or more stations along the track.

17. The independent cart control system of claim 15, wherein the one or more plots comprise respective plots for the at least one of the one or more independent carts.

18. The independent cart control system of claim 15, wherein the one or more plots comprise a plot of an industrial automation process performed by the industrial automation system.

19. A method, comprising:

detecting a throughput degradation of an industrial automation system, wherein the industrial automation system comprises one or more autonomous movers configured to move along a track;

in response to detecting the throughput degradation of the industrial automation system, deploying one or more containers to one or more compute surfaces within the industrial automation system;

retrieving, via the one or more containers, from one or more sensors disposed within the industrial automation system, data associated with the one or more autonomous movers as the one or more autonomous movers move around the track, wherein the data comprises:

a first amount of time for at least one of the one or more autonomous movers to move between two stations of a plurality of stations disposed along the track;

a second amount of time for the at least one autonomous mover to settle at a station of the plurality of stations;

a third amount of time for a respective robot at the station to prepare to perform a process; and a fourth amount of time for the respective robot to perform the process;

identifying, based on the first amount of time, the second amount of time, the third amount of time, or the fourth amount of time, or any combination thereof, a condition contributing to the throughput degradation of the industrial automation system; and generating and transmitting a notification indicative of the throughput degradation and the condition contributing to the throughput degradation.

20. The method of claim 19, wherein the one or more containers comprise a data acquisition container, a data analysis container, a condition diagnosis container, or a remedial action container, or any combination thereof.

*    *    *    *    *